United States Patent [19]

Tsurutani et al.

[11] 4,369,356
[45] Jan. 18, 1983

[54] HEAT-SHRINKABLE COVER SHEET

[75] Inventors: Iwao Tsurutani; Hideto Kataoka; Shinichi Taoka, all of Ichihara, Japan

[73] Assignee: Ube Industries, Ltd., Chiba, Japan

[21] Appl. No.: 254,948

[22] Filed: Apr. 16, 1981

[30] Foreign Application Priority Data

Apr. 22, 1980 [JP] Japan .............................. 55-54016[U]

[51] Int. Cl.³ ........................ H05B 3/10; H02G 15/18
[52] U.S. Cl. .............................. 219/535; 174/DIG. 8; 219/549; 428/36
[58] Field of Search ........................ 428/913, 129, 36; 174/DIG. 8; 219/553, 505, 535, 549; 285/381; 138/156, 162, 166; 264/230; 156/52, 54

[56] References Cited

U.S. PATENT DOCUMENTS

| | | | |
|---|---|---|---|
| 3,491,800 | 1/1970 | Holtor | 138/155 |
| 3,503,101 | 3/1970 | Kolozsvary | 24/204 |
| 3,717,746 | 2/1973 | Breitweiser | 219/535 |
| 4,085,286 | 4/1978 | Horsma | 428/913 |
| 4,117,188 | 9/1978 | Takahashi et al. | 428/129 |
| 4,177,376 | 12/1979 | Horsma et al. | 174/DIG. 8 |

Primary Examiner—Stanley S. Silverman
Attorney, Agent, or Firm—Burgess, Ryan and Wayne

[57] ABSTRACT

A heat-shrinkable cover sheet used for covering and protecting the peripheral surface of a joint of, for example, a steel pipe or cable is provided. The heat-shrinkable cover sheet has two branched tongue-like portions on each of both the ends in the direction of thermal shrinkage. A heating element formed of a heating electric conductor wire is included and built in the body portion of the cover sheet, the front tongue-like portion on one end of the cover sheet and the back tongue-like portion on the other end of the cover sheet, in a manner such that thermal shrinkage of the entire sheet is not prevented. The heating element included in at least one of the tongue-like portions having the heating element included and built therein is independent from the heating element of the body portion of the sheet, so that application of electricity to the independent heating element and stopping of application of electricity to the independent heating element can freely be carried out while electricity is applied to the heating element of the body portion.

9 Claims, 7 Drawing Figures

HEAT-SHRINKABLE COVER SHEET

BACKGROUND OF THE INVENTION (1) Field of the invention

This invention relates to a heat-shrinkable cover sheet having two branched tongue-like portions on both the ends in the direction of thermal shrinkage, which comprises a heating element formed of a heating electric conductor wire included in the body portion of the sheet and the tongue-like portions thereof. This heat-shrinkable cover sheet is used for covering and protecting the peripheral surface of a joint of a steel pipe or cable, and exhibits improved applicability and covering property.

(2) Description of the Prior Art

As the conventional heat-shrinkable cover sheet for steel pipes or cables, there can be mentioned a heat-shrinkable cover sheet having connecting branched tongue-like portions on both the ends thereof in the direction of thermal shrinkage, such as those disclosed in Japanese Patent Application Laid-Open Specifications No. 13577/79 and No. 162777/79.

In the known heat-shrinkable cover sheet, covering is accomplished by winding the heat-shrinkable cover sheet around a joint of a steel pipe or cable, joining the tongue-like portions on both the ends of the sheet to form a cylinder, heating the sheet entirely from the outside by flames of a gas burner or the like to effect thermal shrinkage and joining and sticking the sheet closely to the peripheral face of the joint of the steel pipe or cable. Accordingly, it is difficult to uniformly heat and thermally shrink the sheet along the entire periphery of the joint from the outside by flames, and hence, it is very difficult to obtain a covering having satisfactory performance and durability.

As means for overcoming this disadvantage by the above-mentioned flame heating, Japanese Laid-open Patent Application No. 28,489/81 discloses a heat-shrinkable cover sheet each of the ends of which has two branched tongue-like portions in the direction of thermal shrinkage, in which a heating element formed of a heating electric conductor wire is included in the body portion of the sheet, the front tongue-like portion on one end of the sheet and the back tongue-like portion on the other end of the sheet.

In this heat-shrinkable cover sheet having tongue-like portions on both the ends and having included therein a heating element formed of a heating electric conductor wire, covering is accomplished by winding the sheet around a joint of a steel pipe or cable, joining and engaging the respective tongue-like portions of the heating element with each other so that the tongue-like portions overlap each other to form a cylinder, and then, applying electricity to the heating element to effect joining by heating of the engaged portions of the tongue-like portions and also to effect thermal shrinkage by heating of the entire sheet. In this case, the engaged area of the tongue-like portions is double as thick as the body portion, and have therein two superposed end portions of the heating element. Thus, when electricity is applied to the heating element, the temperature is elevated at a higher rate in the engaged area of the tongue-like portions than in the body portion. Accordingly, when thermal shrinkage of the entire sheet is conducted after termination of joining of the engaged area, various problems arise. For example, the already engaged area is liable to be broken into pieces owing to fusion of an adhesive applied to the engaged area, and the tongue-like portions per se are liable to be destroyed by high temperatures.

SUMMARY OF THE INVENTION

It is, therefore, a primary object of the present invention to provide a heat-shrinkable cover sheet in which the above-mentioned defects are eliminated, and which exhibits an enhanced applicability and covering property.

Other objects and advantages of the present invention will be apparent from the following description.

In accordance with the present invention, there is provided a heat-shrinkable cover sheet having two branched tongue-like portions on each of both the ends in the direction of thermal shrinkage, characterized in that a heating element formed of a heating electric conductor wire is included and built in the body portion of said sheet, the front tongue-like portion on one end of the sheet and the back tongue-like portion on the other end of the sheet, in a manner such that thermal shrinkage of the entire sheet is not prevented, and the heating element included in at least one of the tongue-like portions is independent from the heating element of the body portion of the sheet, so that application of electricity to said independent heating element and stopping of application of electricity to said independent heating element can freely be carried out while electricity is applied to the heating element of the body portion.

DESCRIPTION OF THE PREFERRED EMBODIMENTS

When the heat-shrinkable cover sheet is wound around the joint of a steel pipe or cable, the tongue-like portions on both the ends are engaged with each other so that the tongue-like portions overlap each other, to form a cylinder, and heating is accomplished by applying electricity to the heating element included in the sheet, application of electricity to the heating element in the engaged areas of the tongue-like portions can partially or completely be stopped freely while electricity is being applied to the heating element of the body portion of the sheet. Accordingly, after joining of the engaged areas of the tongue-like portions of the sheet, the engaged areas can be prevented from being excessively heated and this bonding can be maintained strongly while the entire sheet is thermally shrunk.

Furthermore, in the heat-shrinkable cover sheet of the present invention, since the heating element is included and built throughout the sheet, it is possible to heat the entire sheet, except the engaged areas of the tongue-like portions, very uniformly and substantially simultaneously without interruption. Accordingly, a very good covering can be obtained.

The heat-shrinkable cover sheet of the present invention will now be described in detail with reference to the accompanying drawings.

Figure 1:
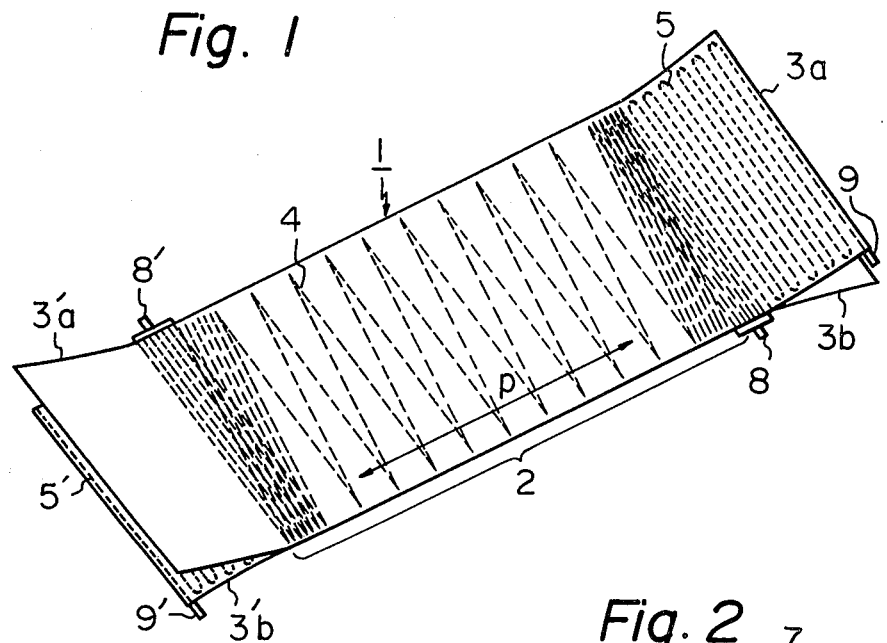
FIG. 1 is a perspective view showing one embodiment of the heat-shrinkable cover sheet of the present invention.
Figure 2:
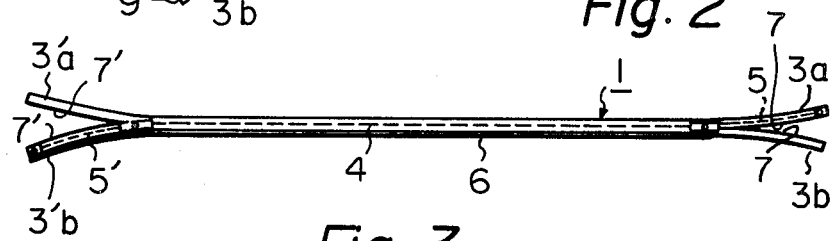
FIG. 2 is a sectional view showing the longitudinal section of the heat-shrinkable cover sheet shown in FIG. 1.

Referring to FIGS. 1 and 2, the heat-shrinkable cover sheet 1 of the present invention has a property of being thermally shrunk in a direction indicated by arrow P, and two pairs of tongue-like portions 3a and 3b and 3'a and 3'b are formed on both the ends of the direction P of the thermal shrinkage, respectively, so that a cylinder will be formed when the tongue-like portions are engaged with each other.

As is shown in FIGS. 1 and 2, the heat-shrinkable cover sheet 1 comprises heating elements formed of heating electric conductor wires 4 and 5, which are included and built in a body portion 2 of the sheet 1, a front tongue-like portion 3a on one end of the sheet and a back tongue-like portion 3'b on the other end of the sheet 1, in a manner such that thermal shrinkage of the entire sheet is not prevented.

As the heating electric conductor wire constituting the heating element, there can be used any wires which generate heat under application of electricity and have good flexibility and softness. For example, there can be used metal wires formed mainly of metals, such as copper, copper alloys, nickel alloys and chromium alloys. From the viewpoint of the flexibility and softness and the heat-generating property, it is preferred that a copper wire having a diameter of about 0.01 to about 1.0 mm be used as the heating electric conductor wire.

In the present invention, it is important that the heating element should be included and built in the heat-shrinkable cover sheet so that the thermal skrinkability of the sheet is not prevented. This can easily be accomplished by arranging the heating element in the interior of the cover sheet in such a manner that the heating electric conductor wires of the heating element are not aligned in parallel to the direction P of thermal shrinkage of the sheet 1 but transverse to said direction P approximately at right angles. For example, the heating electric conductor wires may be arranged in a zigzag form.

Figure 6:
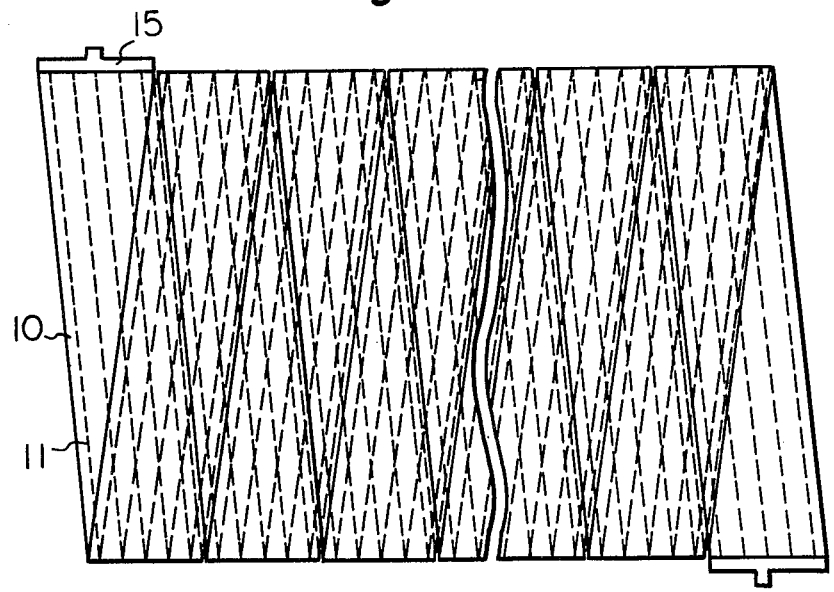
FIGS. 6 and 7 are top plan views showing examples of the heating element to be included and built in the heat-shrinkable cover sheet of the present invention.

As the heating element formed of the heating electric conductor wires, there can be mentioned a strip of a synthetic resin sheet having included therein a plurality of conductor wires 11 arranged in parallel to one another along the longitudinal direction thereof as shown in FIG. 6, said strip being folded in succession at predetermined intervals along folding lines inclined at an acute angle to the transverse direction of the strip. This strip is shaped into a heating element 10 of a two-layer rectangular sheet, and this heating element 10 is included in the cover sheet 1, preferably in the body portion thereof.

FIG. 1 illustrates, by way of example, a heat-shrinkable cover sheet having the above-mentioned heating element 10 in the body portion 2 of the cover sheet 1. The heating element of the body portion 2 of the heat-shrinkable cover sheet 1 shown in FIG. 1 can heat the body portion 2 uniformly and sufficiently, because the heating electric conductor wires 4 are arranged densely throughout the body portion 2. Furthermore, since the heating electric conductor wires 4 arranged in parallel can be connected by only one pair of power source connection terminals 8 and 8', the operation of connecting the heating electric conductor wires 4 to an electric power source can be facilitated and the operation of applying electricity to the heating element can be simplified, as compared with a conventional heat-shrinkable cover sheet provided with many power source connection terminals. Thus, various advantages can be attained by the present invention.

Figure 7:
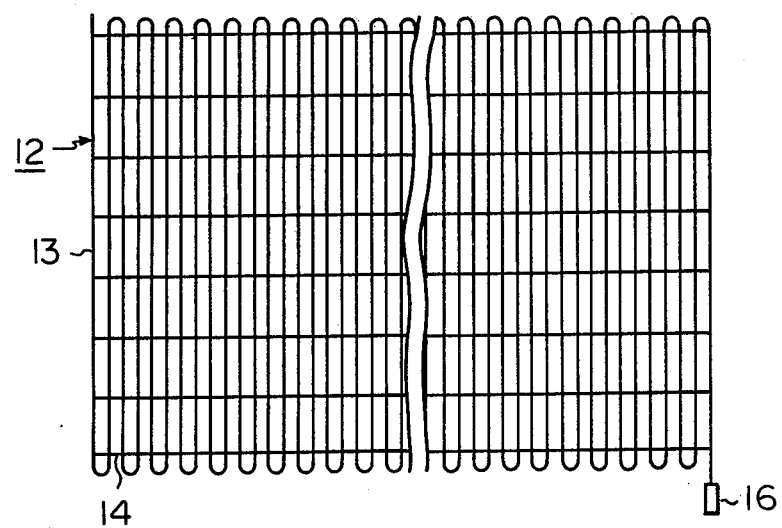

As another example of the heating element to be included in the heat-shrinkable cover sheet, there can be mentioned a net-like member 12 as shown in FIG. 7, which comprises a heating electric conductor wire 13 arranged in a zigzag manner, i.e., arranged as weft reciprocatively at an interval of the length of the cover sheet in a direction substantially rectangular to the direction P of thermal shrinkage of the cover sheet 1, i.e., in the transverse direction of the sheet, and thermoplastic polymer resin strings or yarns 14 (fibers) as warps holding the conductor wire 13, and which is included and built in the cover sheet 1 by sandwiching the electric conductor wire 13 between thermoplastic polymer resin sheets.

As a modification of the net-like heating element shown in FIG. 7, only the zigzag arranged heating electric conductor wire may be sandwiched between thermoplastic polymer resin sheets without the use of warp strings or yarns 14 shown in FIG. 7.

The above-mentioned net-like member 12 or its modification may be included preferably in the tongue-like portions 3a and 3'b of the heat-shrinkable sheet 1.

In the course of manufacturing the heat-shrinkable cover sheet having the heating element shown in FIG. 7 or when such a heat-shrinkable sheet is heated for bonding both the ends thereof or thermally shrinking the sheet entirely, the thermoplastic strings or yarns 14 are thermally softened or molten, and therefore, the shape of strings or yarns is lost and the strings or yarns are integrated with the heat-shrinkable thermoplastic polymer material. Accordingly, in the state where the above-mentioned net-like member 12 is included in the cover sheet, the thermoplastic resin strings or yarn 14 have little or no adverse effect on the thermal shrinkage of the entire sheet.

In the present invention, it is preferred that the average value of the quantity of heat generated per unit area in the heating element included in the heat-shrinkable cover sheet be about 2 to about 30 cal/cm$^2$. min, especially 5 to 20 cal/cm$^2$. min. Incidentally, an optimum value of the quantity of generated heat of the heating element may be determined appropriately according to the size of the cover sheet.

In the present invention, it is indispensable that at least one of the tongue-like portions 3a and 3'b should have, included therein, a heating element independent from the heating element of the body portion 2 of the cover sheet 1 so that application of electricity to the independent heating element of the tongue-like portion and stopping of application of electricity thereto can freely be performed while electricity is applied to the heating element of the body portion 2.

Figure 4:
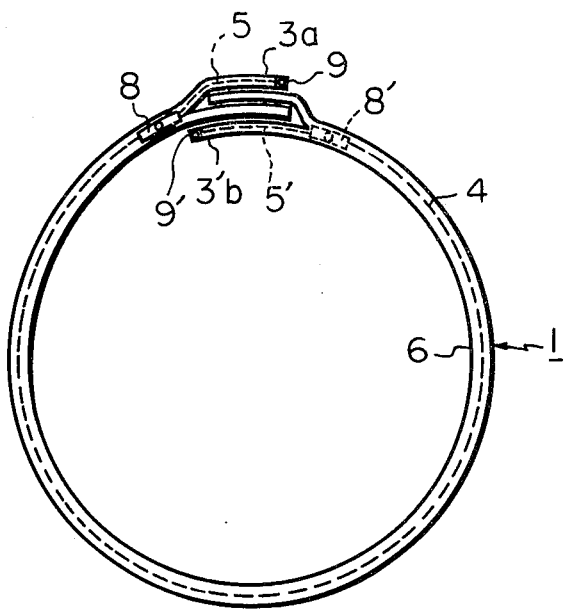
FIGS. 4 and 5 are sectional views illustrating the state in which tongue-like portions on both the ends of the heat-shrinkable cover sheet of the present invention are engaged to form a cylinder.
Figure 5:
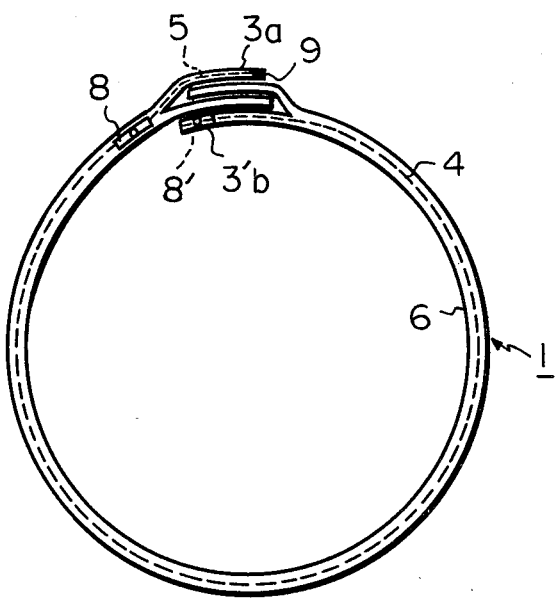

FIGS. 1, 2 and 4 show an embodiment of the cover sheet 1 in which the heating element of the body portion 2, the heating element of the front tongue-portion 3a and the heating element of the back tongue-portion 3'b are independent from one another. FIG. 5 illustrates another embodiment of the cover sheet 1 in which an integrated heating element is included in the body portion 2 and the back tongue-like portion 3'b and a heating element independent from this integrated heating element is included in the front tongue-like portion 3a.

In the heat-shrinkable cover sheet shown in FIG. 1, one end of each of the heating electric conductor wires 5 and 5' of the heating elements of the tongue-like portions 3a and 3'b on both the ends of the cover sheet are connected to electric power connection terminals 8 and 8' of the heating element of the body portion 2, respectively, and switch connection terminals 9 and 9' are attached to the other end of the heating electric conductor wires 5 and 5', respectively.

Figure 3:
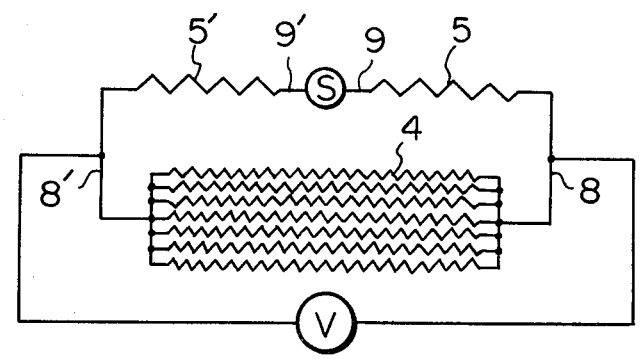
FIG. 3 is a wiring diagram showing state when electricity is applied to the heat-shrinkable cover sheet shown in FIG. 1, which is arranged on the periphery of the joint of a steel pipe.

As shown in FIG. 4, the tongue-like portions on both the ends of the heat-shrinkable cover sheet 1 are engaged with each other in such a fashion that the tongue-like portions having no electric conductor wire included therein are located on the inner side, whereby a cylinder is formed. Then, as shown in FIG. 3, a pair of the electric power connection terminals 8 and 8' are connected to an electric power source V and the switch connection terminals 9 and 9' are connected to each other through a circuit including a switch S. By applying electricity to each of the heating element in this state, bonding of the engaged area of the tongue-like portions on both the ends and thermal shrinkage of the entire sheet are accomplished, thereby covering the peripheral face of the joint of a steel pipe or cable. When electricity is applied to the respective heating elements of the cover sheet 1, at the point when the engaged area of the tongue-like portions are sufficiently heated and integrally bonded to each other, application of electricity to the tongue-like portions 3a and 3'b is stopped by means of the switch S while application of electricity to the heating element of the body portion 2 is continued, whereby thermal shrinkage of the entire sheet is accomplished while retaining a good bonding state in the engaged area of the tongue-like portions.

In the heat-shrinkable cover sheet 1 shown in FIG. 5, a first heating element 4 similar to that of the body portion 2 of the cover sheet 1 shown in FIG. 1 is integrally included and built in both the body portion and back tongue-like portion 3'b of the cover sheet and this heating element 4 is provided with a pair of electric power source connection terminals 8 and 8'. One end of the heating electric conductor wire 5 in a second heating element is connected to the power source connection terminal 8 and a switch connection terminal 9 is connected to the other end of the heating electric conductor wire 5. For application of electricity to the respective heating elements of the heat-shrinkable cover sheet 1 shown in FIG. 5, the electric power connection terminals 8 and 8' are connected to an electric power source, and the switch connection terminal 9 of the tongue-like portion 3a and the power source connection terminal 8' of the tongue-like portion 3'b are connected to a circuit including a switch. In this state, electricity is applied to the respective heating elements. When electricity is applied to the heating elements of the heat-shrinkable cover sheet 1 shown in FIG. 5, at the point when the engaged area of the tongue-like portions is sufficiently heated and integrally bonded to each other, application of electricity to the tongue-like portion 3a is stopped by means of the switch while application of electricity to the heating elements of the back tongue-like portion 3'b and body portion 2 is continued, whereby thermal shrinkage of the entire sheet is accomplished while retaining a strong bonding in the engaged area of the tongue-like portions.

As will be apparent from the foregoing description, in the heat-shrinkable cover sheet of the present invention, the engaged areas of the respective tongue-like portions on both the ends are first heated at a high temperature and the tongue-like portions are integrally bonded together, and then, application of electricity of the tongue-like portions can be stopped. Accordingly, excessive heating of the engaged area of the bonded tongue-like portions can be prevented.

It is preferred that an adhesive layer 6 be formed on the back face of the heat-shrinkable cover sheet of the present invention, as shown in the drawings. Moreover, it is preferred that adhesive layers 7 and 7' be formed on the inner sides of both the tongue-like portions on both the ends of the heat-shrinkable cover sheet of the present invention.

A heat-shrinkable film or sheet of a synthetic resin, such as polyethylene, polypropylene, polyvinyl chloride or polyamide may be used as the heat-shrinkable cover sheet in the present invention. Furthermore, a laminate comprising several layers of such a synthetic resin film or sheet may be used. In this case, heating elements, such as mentioned above, are inserted at predetermined positions and the heat-shrinkable films or sheets and heating elements are heated under pressure to obtain an intended laminated structure.

In order to improve the heat resistance and thermal shrinkability of the heat-shrinkable material, it is preferred that the heat-shrinkable material be crosslinked to a degree of gel fraction of 20 to 70%, especially 30 to 60%, by radiations such as electron rays.

We claim:

1. A heat-shrinkable cover sheet having two branched tongue-like portions on each of both the ends in the direction of thermal shrinkage, characterized in that a heating element formed of a heating electric conductor wire is included and built in the body portion of said sheet, the front tongue-like portion on one end of the sheet and the back tongue-like portion on the other end of the sheet, in a manner such that thermol shrinkage of the entire sheet is not prevented, and the heating element included in at least one of the tongue-like portions is independent from the heating element of the body portion of the sheet, so that application of electricity to said independent heating element and stopping of application of electricity to said independent heating element can freely be carried out while electricity is applied to the heating element of the body portion.

2. A heat shrinkable cover sheet according to claim 1, wherein the heating element comprises a strip of a synthetic resin sheet having a plurality of metal conductor wires arranged therein in parallel to one another along the longitudinal direction of the strip, said strip being folded in succession at predetermined intervals along folding lines inclined at an acute angle to the transverse direction of the strip to form a two-layer rectangular sheet.

3. A heat shrinkable cover sheet according to claim 1, wherein the heating element comprises a heating electric conductor wire arranged in a zigzag manner and reciprocatively at an interval of the length substantially equal to the width of the heat shrinkable cover sheet, said conductor wire being sandwiched between thermoplastic polymer sheets.

4. A heat shrinkable cover sheet according to claim 3, wherein the heating element further comprises thermoplastic polymer resin strings or yarns which hold the zigzag arranged electric conductor wire to form a net-like member.

5. A heat shrinkable cover sheet according to claim 1, wherein a first heating element is included and built in the body portion and a second heating element is included and built in each of the front tongue-like portion on one end of the sheet and the back tongue-like portion on the other end of the sheet.

6. A heat shrinkable cover sheet according to claim 5, wherein:

said first heating element in the body portion comprises a strip of a synthetic resin sheet having a plurality of metal conductor wires arranged therein in parallel to one another along the longitudinal direction of the strip, said strip being folded in succession at predetermined intervals along folding lines inclined at an acute angle to the transverse direction of the strip to form a two-layer rectangular sheet, and said second heating element in each of the tongue-like portions comprises a heating electric conductor wire arranged in a zigzag manner and reciprocatively at an interval of the length substantially equal to the width of the heat-shrinkable cover sheet said conductor wire being sandwiched between thermoplastic polymer sheets.

7. A heat shrinkable cover sheet according to claim 1, wherein a first heating element is included and built in the body portion and in one of the front tongue-like portion on one end of the sheet and the back tongue-like portion on the other end of the sheet, and a second heating element is included and built in the other tongue-like portion.

8. A heat shrinkable cover sheet according to claim 7, wherein:

said first heating element comprises a strip of a synthetic resin sheet having a plurality of metal conductor wires arranged therein in parallel to one another along the longitudinal direction of the strip, said strip being folded in succession at predetermined intervals along folding lines inclined at an acute angle to the transverse direction of the strip to form a two-layer rectangular sheet, and said second heating element comprises a heating electric conductor wire arranged in a zigzag manner and reciprocatively at an interval of the length substantially equal to the width of the heat-shrinkable cover sheet, said conductor wire being sandwiched between thermoplastic polymer sheets.

9. A heat shrinkable cover sheet according to claim 1, wherein the synthetic resin is cross-linked to such an extent that the degree of gel fraction is in the range of from 20 to 70%.

* * * * *